United States Patent
Kobayashi et al.

(10) Patent No.: US 8,720,944 B2
(45) Date of Patent: May 13, 2014

(54) GAS GENERATOR FOR RESTRAINING DEVICE OF VEHICLE

(75) Inventors: Tomoharu Kobayashi, Tatsuno (JP); Naoki Matsuda, Tatsuno (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 13/059,788

(22) PCT Filed: Jan. 14, 2010

(86) PCT No.: PCT/JP2010/050662
§ 371 (c)(1),
(2), (4) Date: Apr. 28, 2011

(87) PCT Pub. No.: WO2010/082682
PCT Pub. Date: Jul. 22, 2010

(65) Prior Publication Data
US 2011/0193330 A1     Aug. 11, 2011

(30) Foreign Application Priority Data
Jan. 15, 2009  (JP) ................. 2009-006468

(51) Int. Cl.
*B60R 21/26* (2011.01)

(52) U.S. Cl.
USPC ............ 280/741; 280/736; 102/530

(58) Field of Classification Search
USPC .......... 280/736, 741; 102/530, 531
See application file for complete search history.

(56) References Cited

U.S. PATENT DOCUMENTS 4,296,084 A   10/1981  Adams et al.
(Continued)

FOREIGN PATENT DOCUMENTS

| CN | 101041345 A | 9/2007 |
|---|---|---|
| DE | 198 12 221 A1 | 9/1998 |

(Continued)

OTHER PUBLICATIONS

Chinese Office Action issued in Chinese Patent Application No. 201080004389.7 on Nov. 23, 2012.

*Primary Examiner* — Paul N Dickson
*Assistant Examiner* — Timothy Wilhelm
(74) *Attorney, Agent, or Firm* — Birch, Stewart, Kolasch & Birch, LLP

(57) ABSTRACT

A gas generator includes,
a housing having a circumferential wall, a first end, and a second end, an
inner tube member disposed in the housing, an outer space thereof being a combustion chamber,
an outer circumference cylindrical member being such that one end opening abuts against a bottom plate of the second end,
an annular porous member provided between the outer circumference cylindrical member and the cup-shaped inner tube member so as to form a space above the combustion chamber,
a gas discharge path formed between the outer circumference cylindrical member and an inner wall surface of the circumferential wall portion of the housing;
a communicating portion communicating the space and the gas discharge path, and being provided in the other end opening of the outer circumference cylindrical member; and
a total cross-sectional area of the gas discharge port being smaller than a smallest cross-sectional area of a gas pathway.

9 Claims, 2 Drawing Sheets

(56) References Cited

U.S. PATENT DOCUMENTS

| | | | |
|---|---|---|---|
| 5,048,862 A | 9/1991 | Bender et al. | |
| 5,087,070 A | 2/1992 | O'Loughlin et al. | |
| 5,306,041 A * | 4/1994 | Ogawa et al. | 280/741 |
| 5,458,371 A | 10/1995 | Fulmer et al. | |
| 5,525,306 A * | 6/1996 | Schmucker et al. | 422/165 |
| 5,564,741 A * | 10/1996 | Ward et al. | 280/740 |
| 5,582,427 A | 12/1996 | Rink et al. | |
| 5,622,380 A * | 4/1997 | Khandhadia et al. | 280/736 |
| 5,624,133 A * | 4/1997 | Wong | 280/740 |
| 5,765,866 A * | 6/1998 | Canterberry et al. | 280/741 |
| 5,839,754 A * | 11/1998 | Schluter et al. | 280/736 |
| 5,851,028 A * | 12/1998 | Thibodeau | 280/736 |
| 5,951,040 A | 9/1999 | McFarland et al. | |
| 5,984,352 A * | 11/1999 | Green et al. | 280/736 |
| 6,126,197 A * | 10/2000 | Muir et al. | 280/741 |
| 6,142,515 A | 11/2000 | Mika | |
| 6,227,565 B1 | 5/2001 | McFarland et al. | |
| 6,234,521 B1 | 5/2001 | Katsuda et al. | |
| 6,290,256 B1 * | 9/2001 | McFarland et al. | 280/736 |
| 6,540,256 B2 * | 4/2003 | Iwai et al. | 280/736 |
| 6,929,284 B1 | 8/2005 | Saso et al. | |
| 6,942,249 B2 * | 9/2005 | Iwai et al. | 280/741 |
| 7,591,483 B2 | 9/2009 | Nakayasu et al. | |
| 7,600,783 B2 | 10/2009 | Numoto et al. | |
| 7,763,092 B2 | 7/2010 | Koyama et al. | |
| 7,806,954 B2 | 10/2010 | Quioc | |
| 8,424,908 B2 * | 4/2013 | Kobayashi et al. | 280/741 |
| 2003/0051630 A1 | 3/2003 | Katsuda et al. | |
| 2003/0137139 A1 | 7/2003 | Iwai et al. | |
| 2004/0155444 A1 | 8/2004 | Matsuda et al. | |
| 2005/0001414 A1 | 1/2005 | Matsuda et al. | |
| 2007/0063494 A1 | 3/2007 | Saito et al. | |
| 2007/0095035 A1 * | 5/2007 | Quioc | 55/462 |
| 2007/0222195 A1 | 9/2007 | Yabuta et al. | |
| 2008/0118408 A1 | 5/2008 | Numoto et al. | |
| 2010/0117344 A1 | 5/2010 | Windhausen et al. | |

FOREIGN PATENT DOCUMENTS

| | | |
|---|---|---|
| DE | 100 02 799 A1 | 1/2001 |
| DE | 10 2007 052 828 A1 | 5/2008 |
| DE | 10 2007 033 344 A1 | 5/2009 |
| EP | 0 012 626 A1 | 6/1980 |
| EP | 1 127 753 A1 | 8/2001 |
| EP | 1 671 856 A1 | 6/2006 |
| EP | 1 837 253 A1 | 9/2007 |
| FR | 2 922 007 A1 | 4/2009 |
| GB | 2 022 194 A | 12/1979 |
| JP | 5-213147 A | 8/1993 |
| JP | 3004037 U | 11/1994 |
| JP | 10-95302 A | 4/1998 |
| JP | 2000-198409 A | 7/2000 |
| JP | 2000-296756 A | 10/2000 |
| JP | 2001-301561 A | 10/2001 |
| JP | 2005-53382 A | 3/2005 |
| JP | 2005-193762 A | 7/2005 |
| JP | 2007-15573 A | 1/2007 |
| JP | 2007-131254 A | 5/2007 |
| JP | 2008-114718 A | 5/2008 |
| WO | WO 94/25315 A1 | 11/1994 |
| WO | WO 2009/043904 A2 | 4/2009 |

* cited by examiner

GAS GENERATOR FOR RESTRAINING DEVICE OF VEHICLE

BACKGROUND OF THE INVENTION

1. Field of the Invention

The present invention relates to a gas generator for a restraining device of a vehicle, such as an airbag apparatus.

2. Description of the Related Art

A gas regenerator using a gas generating agent needs a filter for cooling and filtering combustion gas generated from the gas generating agent. However, the large volume of the filter is the cause of the increase in mass of the entire gas generator, thus there is an attempt to reduce the mass and volume of the filter.

JP-U No. 3,004,037 discloses a gas generator that eliminates a first cooling filter 20 by disposing a baffle member 36 within a first slag capturing chamber 50 in FIG. 1.

SUMMARY OF THE INVENTION

A gas generator for a restraining device of a vehicle including:

a housing forming an outer shell container of the gas generator, and having a circumferential wall portion which is provided with a gas discharge port, a first end and a second end, opposite to the first end, the first end and the second end being both closed;

a cup-shaped inner tube member disposed in the housing so that an opening end portion thereof is located in a side of a bottom plate of the second end of the housing, an inside of the cup-shaped inner tube member being an ignition chamber accommodating an ignition device, an outer space of the cup-shaped inner tube member being a combustion chamber charged with a gas generating agent, the inner tube member defining an inner circumferential surface of the combustion chamber, an outer circumference cylindrical member provided within the housing for defining an outer circumferential surface of the combustion chamber such that one end opening thereof abuts against a bottom plate of the second end of the housing, an annular porous member defining an upper surface of the combustion chamber and being provided between the outer circumference cylindrical member and the cup-shaped inner tube member such that a space is formed between the annular porous member and the bottom plate of the first end of the housing a gas discharge path formed between the outer circumference cylindrical member and an inner wall surface of the circumferential wall portion of the housing, a communicating portion communicating the space and the gas discharge path, and being provided in the other end opening portion of the outer circumference cylindrical member, and a total cross-sectional area ($A_1$) of the gas discharge port being smaller than a smallest cross-sectional area ($A_2$) of a gas pathway extending from the combustion chamber to the gas discharge path and allowing combustion gas of the gas generating agent pass therethrough ($A_1 < A_2$).

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
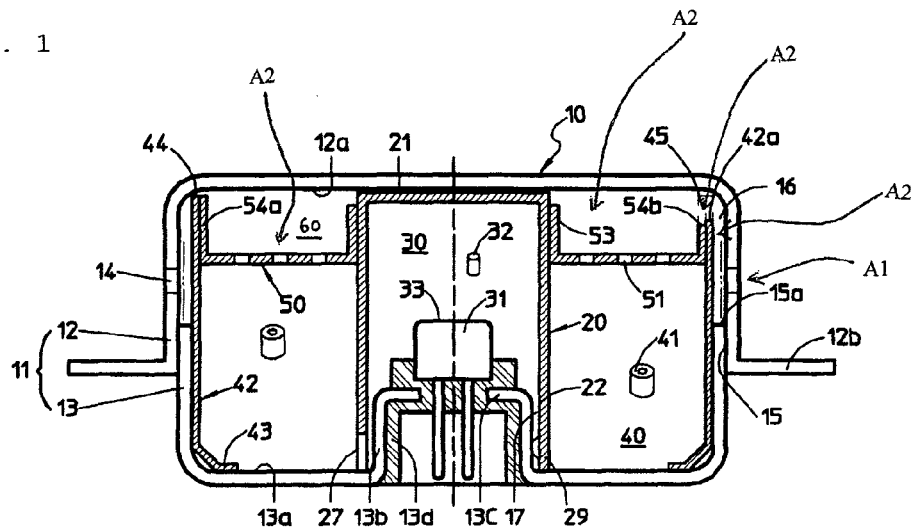
FIG. 1 shows an axial sectional view of a gas generator according to the present invention.

JP-U No. 3,004,037 still needs a second cooling filter 10 and a filter 11 and therefore cannot reduce the weight of a gas generator sufficiently.

The present invention provides a gas generator for a restraining device of a vehicle, which is capable of reducing the weight of the entire gas generator by eliminating a filter for cooling and filtering combustion gas.

In the gas generator of the present invention, in the process of discharging the combustion gas, the combustion gas collides with the annular porous member and thereafter flows into the annular space to come into contact with an inner wall surface thereof. Subsequently, the combustion gas flows into the cylindrical gas discharge path and is discharged from the gas discharge ports while contacting a wall surface of the gas discharge path. Because the speed of the combustion gas flowing inside the gas generator can be inhibited at the gas discharge ports ($A_1 < A_2$), the time period, during which the combustion gas is in contact with wall surfaces forming the gas pathway, can be increased by controlling the time period during which the combustion gas passes through the gas pathway extending from the combustion chamber to the gas discharge ports.

Therefore, combustion residues contained in the combustion gas adhere to and are held by a contact surface each time the above-mentioned contact occurs, whereby the amount of combustion residues discharged from the gas discharge ports is reduced. For this reason, a filter that occupies a larger mass and a significant volume percentage in the gas generator can be simplified or reduced in size, thereby contributing largely to reduction in size and weight of the entire gas generator. Note that the combustion residues described in the present invention are derived from the metal components contained in the gas generating agent and are the same as "slag" described in JP-U No. 3,004,037.

As described above, the gas generator of the present invention can simplify or eliminate a conventionally used filter or coolant. Therefore, the size and weight of the gas generator can be reduced. The filter described here is a filter that is disposed around a gas generating agent and cools combustion gas of the gas generating agent and filters the combustion residues, for example, a filter that is disposed in the form of a cylinder around a gas generating agent (described in JP-A No. 2005-53382), and a filter that is disposed on or above a gas generating agent (described in U.S. Pat. No. 6,142,515), or a filter that is laid between gas generating agents in a combustion chamber. However, such filter or coolant may be used in order to improve the effect of capturing the residues.

Moreover, due to the function of the outer circumference cylindrical member, the combustion gas also flows from the bottom plate of the second end of the housing to the bottom plate of the first end of the housing, passes through the porous member, further passes through the gas discharge path, and is thereafter discharged from the gas discharge ports. Note that in addition to the communicating portion, an opening for communicating the combustion chamber and the gas discharge path with each other may be formed on a circumferential wall surface of the outer circumference cylindrical member, as long as the purpose of the present invention is achieved. Furthermore, when disposing a filter, the filter can be disposed in the space formed by the porous member and the bottom plate of the first end of the housing, or in the combustion chamber, or along inner/outer circumferential wall surfaces of the outer circumference cylindrical member.

In this gas discharge process, the combustion gas collides with the porous member, then with the bottom surface of the first end of the housing, then with a side wall surface of the first end of the housing, and is then discharged from the gas discharge ports while being in contact with a wall surface of an annular gap. Therefore, the residues contained in the combustion gas adhere to and are held by the surfaces each time the above-mentioned collision occurs, reducing the amount of the combustion residues. Thus, a filter that occupies a significant mass or volume percentage in the gas generator can be simplified, reduced in size, or eliminated, thereby contributing largely to reduction in size and weight of the entire gas generator.

The housing that forms the outer shell container of the gas generator may be the one with a short cylindrical shape (the diameter thereof is greater than the axial length) that is formed by a diffuser shell and a closure shell as shown in FIG. 1 of JP-A No. 10-95302, or the one with a long cylindrical shape (cylinder) in which both opened ends of a cylinder portion are sealed by a sealing member as shown in FIG. 1 of JP-A No. 2007-15573, but the housing is not limited thereto.

The present invention preferably provides the gas generator for a restraining device of a vehicle, wherein the annular porous member has a first annular planar portion having a plurality of holes, a first annular outside wall surface portion formed on an outer circumference of the first annular planar portion, and a first annular inside wall surface portion formed on an inner circumference of the first annular planar portion and on the same side as the first annular outside wall surface portion.

The present invention provides the gas generator for a restraining device of a vehicle, wherein the annular porous member has a first annular planar portion having a plurality of holes, a first annular outside wall surface portion formed on an outer circumference of the first annular planar portion, and a first annular inside wall surface portion formed on an inner circumference of the first annular planar portion and on a side opposite to the first annular outside wall surface portion.

When a central hole of the annular porous member is fitted to the cup-shaped inner tube member, the first annular outside wall surface portion abuts against the outer circumference cylindrical member, and the first annular inside wall surface portion abuts against the inner tube member, so that the annular porous member can be attached easily. Therefore, the annular space can also be formed easily. Note that such abutment can be carried out with at least one of the combinations between the first annular outside wall surface portion and the outer circumference cylindrical member, and the first annular inside wall surface portion and the inner tube member.

The present invention preferably provides the gas generator for a restraining device of a vehicle, wherein a gas collision member is disposed on the porous member in the space, the gas collision member has concave and convex surfaces forming a gas pathway, the outer circumferential side of the gas pathway is sealed in one of the concave surface or convex surface by an outside wall surface formed on an outer circumferential portion thereof, and combustion gas of the combustion chamber collides with the gas collision member after passing through the holes of the porous member, and is discharged to the gas discharge path through the gas pathway that is not sealed.

By disposing the gas collision member in the annular space, the time period, during which the combustion gas contacts with the wall surfaces, can be increased, enhancing the effect of capturing the combustion residues.

The present invention preferably provides the gas generator for a restraining device of a vehicle, wherein the gas discharge ports are formed closer to the second end of the housing than the communicating portion, the housing includes a closure shell and a diffuser shell having the gas discharge port in a side surface portion of the diffuser shell, and the diffuser shell has a flange portion extending from the side surface portion to the outside in the radial direction, and the flange portion exists on an imaginary straight line connecting the communication portion to the gas discharge ports.

Because the communication portion and the gas discharge ports are disposed in the positional relationship described above, the distance in which the combustion gas moves in the gas discharge path and the contact area between the combustion gas and the wall surface of the gas pathway increase, improving the effect of cooling the combustion gas and the effect of capturing the combustion residues.

When the communicating portion and the gas discharge ports are disposed in the positional relationship described above, the combustion gas that is ejected from the gas discharge ports is ejected downward (toward the closure shell side) instead of a direction perpendicular to the axial direction of the housing. As a result, the flange portion exists on the imaginary straight line connecting the communication portion to the gas discharge ports, and thereby, even when the combustion residues are contained in the combustion gas discharged from the gas discharge ports, the combustion gas containing the combustion residues collides with the flange portion, and then the combustion residues can be captured.

The present invention preferably provides the gas generator for a restraining device of a vehicle, which does not include a filter for cooling and filtering the combustion gas generated by combustion of the gas generating agent.

Because a filter that occupies a significant mass or volume percentage of the gas generator can be eliminated, the size and weight of the entire gas generator can be reduced significantly.

According to the gas generator of the present invention, the reduction in size and weight of the entire gas generator can be accomplished by simplifying or eliminating a filter large in mass.

The present invention can be used in a gas generator for a restraining device of a vehicle, such as an airbag apparatus mounted in various automobiles.

Figure 2:
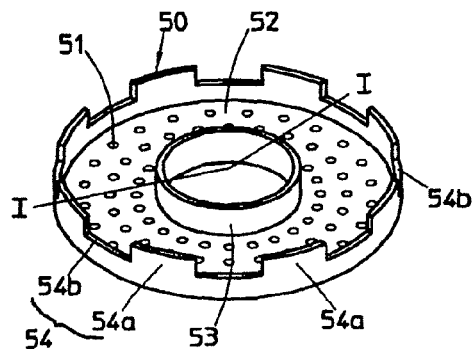
FIG. 2 shows a perspective view of a porous member used in FIG. 1.

Embodiment of the Invention (1) Gas Generator Shown in FIG. 1 and FIG. 2

FIG. 1 is a sectional view of a gas generator 10 in an axial direction. FIG. 2 is a perspective view of a porous member used in the gas generator shown in FIG. 1, and the porous member in FIG. 1 is shown in a sectional view taken along the line I-I of FIG. 2 in order to illustrate its shape clearly.

A metallic housing 11 is obtained by welding and fixing a diffuser shell 12 and a closure shell 13 together at a contact portion. As shown in FIG. 1, the diffuser shell 12 and the closure shell 13 are in the form of a cup, having one end open. A flange 12b that has a hole 12c for fixing the housing to an airbag module (not shown) or the like is formed at an opening portion of the diffuser shell 12. The contact portion is welded and fixed (welded/fixed portion 15) such that an opening portion of the closure shell 13 is inserted into the opening portion of the diffuser shell 12, and a step 15a shown in FIG. 1 is provided on an inner circumferential surface of the welded/fixed portion 15.

A bottom plate 12a of the diffuser shell is a first end of the housing 11, and a bottom plate 13a of the closure shell is a second end of the housing 11.

The diffuser shell 12 has a plurality of gas discharge ports 14 in its side surface portion, and the gas discharge ports 14 are sealed from the inside by an aluminum tape for prevention of moisture.

In a central portion of a bottom plate 13a of the closure shell 13, an igniter attaching portion is formed. The igniter attaching portion includes a cylindrical portion 13b projecting toward an ignition chamber 30, and an inward flange 13c facing inward from the cylindrical portion 13b. The igniter attaching portion is formed integrally with the bottom surface 13a of the closure shell 13 by press-molding. Instead of integrally forming the igniter attaching portion with the closure shell as shown in FIG. 1, a conventional separate metallic igniter collar (with an igniter fixed thereto) may be used as the igniter attaching portion and then fixed to the closure shell by welding or crimping.

A cup-shaped inner tube member 20 is disposed in a central portion of the housing 11. The inner tube member 20 is press-fitted to the igniter attaching portion (cylindrical portion 13b) such that a bottom surface 21 of the tube member is separated from a bottom plate (a top panel in the state shown in FIG. 1) 12a of the diffuser shell 12 and an opening end portion 29 of the tube member abuts against the bottom plate 13a of the closure shell 13. Note that the bottom surface 21 may abut against the bottom plate (the top panel in the state shown in FIG. 1) 12a of the diffuser shell 12. Instead of press-fitting, the inner tube member 20 may be fixed to the igniter attaching portion by a well known method such as crimping or welding.

The inside of the inner tube member 20 is the ignition chamber 30 accommodating the igniter 31 and a transfer charge (or a gas generating agent) 32 therein. The igniter 31 has an igniting portion 33 accommodating the ignition charge therein, and is integrally injection-molded with the igniter attaching portion by using a resin 13d.

The opening end portion 29 of the inner tube member 20 has a plurality of cutout portions formed by partially cutting a rim of the opening end portion 29, and a concave portion of the cutout portion and the bottom plate 13a of the closure shell 13 form a ventilating portion 27 for allowing a combustion product generated in the ignition chamber 30 (flame, combustion gas, and the like) to pass through to a combustion chamber 40. Furthermore, a passage 17 extending from the ignition chamber to the ventilating portion is formed between the cylindrical portion 13b of the igniter attaching portion and a circumferential wall portion 22 of the cylindrical member 20. Note that in addition to the ventilating portion 27, a communicating hole may be formed on the circumferential wall portion of the inner tube member 20 for communicating the combustion chamber 40 and the ignition chamber 30. In FIG. 1, the igniter 31 is disposed coaxially with the central axis of the housing 11. However, when, for example, the igniter 31 is provided eccentrically with respect to the central axis, a larger number of ventilating portions 27 can be formed in a direction within the combustion chamber where there is more of the gas generating agent (for example, the cylindrical member and the igniter fixing portion of the present invention may be applied to the flame-transferring tube 18 and igniter collar 32 of the gas generator shown in FIG. 1 of JP-A No. 2008-114718, to form a communicating structure in the ignition chamber and the combustion chamber).

An outer circumference cylindrical member 42, which is press-fitted to an inner wall surface of the closure shell 13, and an annular porous member 50, which is provided between the outer circumference cylindrical member 42 and the inner tube member 20, are disposed in a cylindrical space outside the inner tube member 20. And these members define the combustion chamber 40 charged with a gas generating agent 41. The porous member 50 has a plurality of holes 51 smaller than the size of the gas generating agent.

An outer circumferential surface of the combustion chamber 40 is defined by the outer circumference cylindrical member 42, an inner circumferential surface by the inner tube member 20, a bottom surface by the bottom plate 13a of the closure shell 13, and an upper surface by the annular porous member 50 having a plurality of holes.

An opening portion 43 on one end side of the outer circumference cylindrical member 42 is in the form of an inward flange and abuts against the bottom plate 13a of the closure shell 13, while an opening portion 44 on the other end is disposed at a distance from the bottom plate 12a of the diffuser shell. A lower section of a circumferential wall of the outer circumference cylindrical member 42 is in contact to an inner circumferential wall surface of the closure shell 13. Here, a cylindrical gas discharge path 16 is formed between an upper half of a circumferential wall of the outer circumference cylindrical member 42 and an inner circumferential wall surface of the diffuser shell 12 by the step 15a formed in the vicinity of the welded/fixed portion 15. A rim of the opening portion 44 of the outer circumference cylindrical member 42 has a partially cutout portion 42a. Other than the cutout portion 42a, no opening directly communicating the combustion chamber 40 with the gas discharge path 16 is formed in the outer circumference cylindrical member 42.

The annular porous member 50 has, as shown in FIG. 2, a first annular planar portion 52 having the plurality of holes 51, a first annular outside wall surface portion 54 formed on an outer circumference of the first annular planar portion 52, and a first annular inside wall surface portion 53 formed on an inner circumference of the first annular planar portion 52. The first annular outside wall surface portion 54 and the first annular inside wall surface portion 53 are formed so as to extend in the same direction with respect to the first annular planner portion 52.

Moreover, as shown in FIG. 1, the annular porous member 50 is fitted between the outer circumference cylindrical member 42 and the inner tube member 20. An annular space 60 is formed by the annular porous member 50, the outer circumference cylindrical member 42, the inner tube member 20, and the bottom plate 12a of the diffuser shell.

The first annular outside wall surface portion 54 is created by forming eight convex portions 54a and eight concave portions 54b alternately in the circumferential direction, and forms, along with the cutout portion 42a of the outer circumference cylindrical member 42, a communicating portion 45 communicating the annular space 60 and the gas discharge path 16 with each other. The communicating portion 45 is formed closer to the bottom plate 12a of the diffuser shell 12 than the gas discharge ports 14. In other words, the gas discharge ports 14 are formed closer to the bottom plate 13a of the closure shell 13 than the communicating portion 45. As shown in FIG. 1, when the annular porous member 50 is fitted between the outer circumference cylindrical member 42 and the inner tube member 20, the communicating portion is formed by aligning the cutout portion of the outer circumference cylindrical member 42 with the positions of the eight concave portions 54b.

Figure 3:
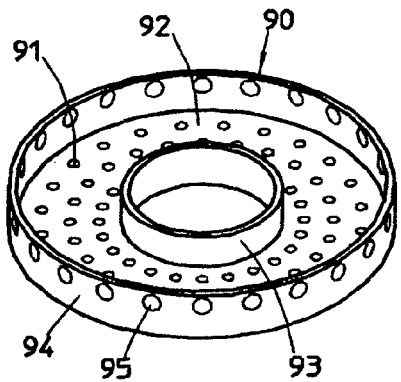
FIG. 3 shows a perspective view of the porous member in another embodiment.

The gas generator 10 of the present invention can use a porous member 90 shown in FIG. 3, in place of the porous member 50 shown in FIG. 2.

The annular porous member 90 has a first annular planar portion 92 having a plurality of holes 91, a first annular outside wall surface portion 94 formed on an outer circumference of the first annular planar portion 92, and a first annular inside wall surface portion 93 formed on an inner circumference of the annular planar portion 92. The first annular outside wall surface portion 94 and the first annular inside wall surface portion 93 are formed on the same side (so as to extend in the space 60 side). A plurality of communication holes 95 are formed circumferentially with equal intervals in the first annular outside wall surface portion 94.

As with the porous member 50 shown in FIG. 2, the diameter of the hole 91 of the porous member 90 shown in FIG. 3 is smaller than the size of the gas generating agent 41 (size per single gas generating agent 41). It is preferred that each hole 51, 91 have the size that allows the gas generating agent to remain inside the combustion chamber 40 and burn completely without passing through the hole 51, 91 during the combustion of the gas generating agent. Alternatively, the size of each hole 51, 91 may be set to be larger than the size of the gas generating agent 41 (size per single gas generating agent), and a known filter or coolant such as a coarse wire mesh or screen may be disposed between the gas generating agent 41 and the first annular planar portion 52, 92.

In the gas generator 10, the total opening area ($A_1$) of the plurality of gas discharge ports 14 is smaller than the smallest cross-sectional area ($A_2$) of the gas pathway ($A_1<A_2$). The gas pathway is a path between the holes 51 of the porous member 50 to the gas discharge ports 14. The smallest cross-sectional area of the gas pathway indicates the smallest one out of the total opening area of the holes 51, the cross-sectional area of the communicating portion 44, the cross-sectional area of the space 60, and the cross-sectional area of the cylindrical gas discharge path 16.

An operation when the gas generator 10 shown in FIG. 1 and FIG. 2 is incorporated in a known airbag apparatus of a vehicle is described next.

When the igniter 31 is activated, the transfer charge (or gas generating agent) 32 is ignited and burnt by a flame generated from the ignition portion 33, whereby the combustion product (flame, combustion gas, and the like) is generated. The combustion product is released from the passage 17 into the combustion chamber 40 after passing through the ventilating portion 27, and then ignites and burns the gas generating agent 41.

The combustion gas is generated by combustion of the gas generating agent 41. Part of the combustion residues generated along with the combustion gas collide with the first annular planar plate 52 while passing through the holes 51 of the porous member 50, and as a result the combustion residues adhere to and are held by the first annular planar portion 52.

The combustion residues that have passed through the holes 51 then collide with the bottom plate 12a of the diffuser shell when flowing into the annular space 60, and adhere to and are held by the bottom plate 12a.

The combustion gas that has flowed into the annular space 60 then collides with the first annular outside wall surface portion 54 (the convex portions 54a and the concave portions 54b) of the porous member 50 while flowing out of the communicating portion 45, and the combustion residues adhere to and are held by the first annular outside wall surface portion 54.

Thereafter, the combustion gas that has passed through the communicating portion 45 collide with the inner circumferential wall surface of the diffuser shell 12 opposing the communicating portion 45, whereby the combustion residues adhered to and are held by the inner circumferential wall surface.

Thereafter, the combustion gas passes through the gas discharge path 16, breaks the aluminum tape attached to the gas discharge ports 14, and is released from the gas discharge ports 14 to the inside of the airbag. At this moment, because the outer circumference cylindrical member 42 defines the communicating portion 45 in the vicinity of the bottom plate 12a of the diffuser shell, and the gas discharge ports 14 are formed closer to the closure shell 13 side rather than the communicating portion 45 side, the combustion gas flowing out of the communicating portion 45 collides with the inner circumferential wall surface of the diffuser shell 12 easily, whereby time and a distance for which the combustion gas passes through the cylindrical gas discharge path 16 are increased, further improving the effect of capturing the combustion residues in the gas discharge path.

Because the relationship of $A_1<A_2$ is satisfied in the gas generator 10 of the present invention, the speed of the combustion gas flowing in the gas generator is suppressed at the gas discharge ports 14, and the time period, during which the combustion gas (and combustion resides) contacts with the wall surfaces of the gas pathway extending from the combustion chamber to the gas discharge port, is increased.

When the gas generating agent 41 within the combustion chamber 40 is burnt, the combustion gas repeatedly collides with a plurality of surfaces until being released from the gas discharge ports 14, and the combustion residues adhere to and are held by these surfaces. Thus, a filter for cooling and filtering the combustion gas can be simplified or eliminated.

Figure 4:
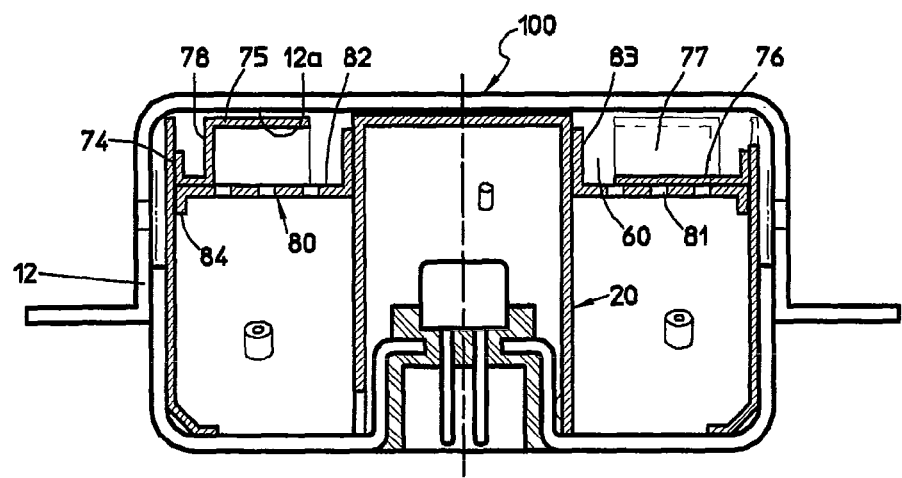
FIG. 4 shows an axial sectional view of a gas generator according to yet another embodiment of the present invention.
Figure 5:
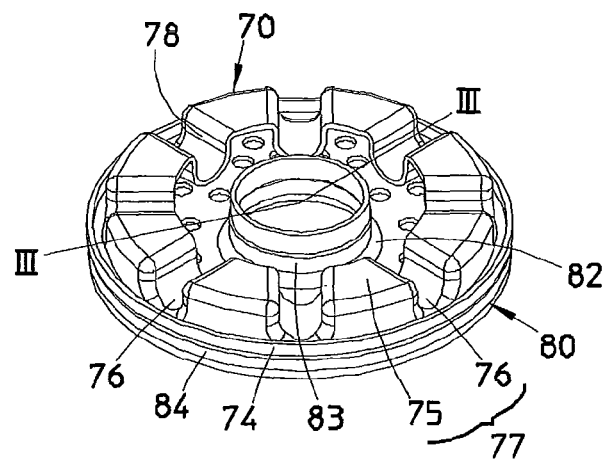
FIG. 5 shows a perspective view of a gas collision member disposed on the porous member and used in FIG. 4.

(2) Gas Generator Shown in FIG. 4 and FIG. 5

FIG. 4 is a sectional view of a gas generator 100 in an axial direction. FIG. 5 is a perspective view of an annular porous member in combination with a gas collision member 70 used in the gas generator shown in FIG. 4, but in FIG. 4, the porous member is shown in a sectional view taken along the line III-III of FIG. 5 in order to illustrate its shape clearly. The gas generator 100 shown in FIG. 4 is the same as the gas generator 10 shown in FIG. 1, except that a combination of an annular porous member 80 and a gas collision member 70 is used in place of the porous member 50.

The porous member 80 has a first annular planar portion 82 having a plurality of holes 81, a first annular outside wall surface portion 84 formed on an outer circumference of the first annular planar portion 82, and a first annular inside wall surface portion 83 formed on an inner circumference of the first annular planar portion 82. The first annular outside wall surface portion 84 is formed so as to extend into an opposite side to the first annular inside wall surface portion 83 unlike the one shown in FIG. 2 (in FIG. 4, the first annular outside wall surface portion 84 extends towards the combustion chamber 40 and the first annular inside wall surface portion 83 extends towards the space 60). The first annular outside wall surface portion 84 does not include the concave/convex portion in the axial direction as shown in FIG. 2, but has a uniform height.

The gas collision member 70 has a concave/convex surface 77 and a second annular outside wall surface portion 74 formed on an outer circumference of the concave/convex surface 77. The concave/convex surface includes a convex surface portions 75 and a concave surface portions 76 and forms a gas passage in the radiation direction.

Each convex surface portion 75 of the annular gas collision member 70 has the height corresponding to a side surface portion 78, and the inside of the convex surface portion 75 is formed into a tunnel-like shape in the radial direction such that the combustion gas that has passed through the holes 51 flows therein inwardly in the radial direction. Each concave surface portion 76 formed between two adjacent convex surface portions 75 allows the combustion gas colliding with the convex surface portions 75 to flow to the cylindrical gas discharge path 16, thus the cross-sectional shape thereof is not particularly limited as long as it does not inhibit the gas flow.

In the space 60, the gas collision member 70 is placed on the porous member 80 such that an inner rim of a central hole of the gas collision member 70 is placed with a distance from the porous member 80 or the first annular inside wall surface portion 83. Although the gas collision member 70 is not fixed to the porous member 80, the abutment between the second annular outside wall surface portion 74 and the outer circumference cylindrical member 42 prevents the gas collision member 70 from being displaced.

An operation when the gas generator 100 shown in FIG. 4 and FIG. 5 is incorporated in a known airbag apparatus of a vehicle is described next.

When the igniter 31 is activated, the transfer charge (or gas generating agent) 32 is ignited and burnt by a flame generated from the ignition portion 33, whereby the combustion product (flame, combustion gas, and the like) is generated. The combustion product reaches the ventilating portion 27 after passing through the passage 17 and is released into the combustion chamber 40, and ignites and burns the gas generating agent 41.

The combustion gas generated by combustion of the gas generating agent 41 contains the combustion residues, part of which collide with the first annular planar portion 82 while passing through the holes 81 of the porous member 80, and as a result, the combustion residues adhere to and are held by the first annular planar portion 82.

The combustion gas that has passed through the holes 81 then flows into the space 60 and part of the gas collides with the convex surface portion 75, causing the combustion residues to adhere to and be held by this surface. The remaining residues collide with the bottom plate 12a of the diffuser shell and as a result, adhere to and are held by this surface. The combustion gas that has collided with the convex surface portion 75 changes its direction to the inside in the radial direction to hit the inner tube member 20 or the first annular inner wall surface portion 83, and further changes its direction to flow toward the communicating portion 45 through the concave surface portions 76. The combustion gas then passes through the gas discharge path 16 and flows to the gas discharge ports 14. Because the combustion gas changes its flow direction, the combustion residues adhere to the collision wall surface of the collision member 70.

The combustion gas collides with the outer circumference cylindrical member 42 while flowing out of the communicating portion 45, causing the combustion residues to adhere to and be held by the outer circumference cylindrical member 42.

Thereafter, the combustion gas that has passed through the communicating portion 45 collides with the inner circumferential wall surface of the diffuser shell 12 opposing to the communicating portion 45, causing the combustion residues to adhere to and be held by the inner circumferential wall surface.

Thereafter, the combustion gas passes through the gas discharge path 16, breaks the aluminum seal tape, and is released from the gas discharge ports 14 to the inside of the airbag. At this moment, because the outer circumference cylindrical member 42 defines the communicating portion 45 in the vicinity of the bottom plate 12a of the diffuser shell, and the gas discharge ports 14 are formed closer axially to the closure shell 13 side rather than the communicating portion 45, the time period, during which the combustion gas discharged from the communicating portion 45 passes through the gas discharge path 16, is increased (the time period, during which the combustion gas is in contact with the wall surface of the gas discharge path 16, is increased), further improving the effect of capturing the combustion residues and the effect of cooling the combustion gas.

In addition, due to the positional relationship between the communicating portion 45 and the gas discharge ports 14, the combustion gas is ejected from the gas discharge ports 14 toward the direction (toward the bottom plate 13a side of the closure shell 13) lower than one perpendicular to the axial direction of the housing (horizontal direction). And since the flange portion 12b exists on the imaginary straight line connecting the communicating portion 45 and the gas discharge ports 14, the generated combustion gas collides with this flange portion 12b, and consequently the combustion residues contained in the combustion gas adhere to the flange portion 12b. Note that the residues are captured not only by the flange portion 12b, for example, in the case where a retainer ring (not shown) for fixing the airbag is placed on the flange portion 12b when the gas generator is mounted in an airbag module, the combustion gas collides with this retainer ring and the combustion residues are captured by the ring.

Because the relationship of $A_1 < A_2$ is satisfied in the gas generator 100 of the present invention, the speed of the combustion gas flowing inside the gas generator is suppressed by the gas discharge ports 14, and the time period, during which the combustion gas (and the combustion resides) contacts with entire wall surfaces forming the gas pathway, is increased.

When the gas generating agent 41 within the combustion chamber 40 is burnt, the combustion gas repeatedly collides with a plurality of surfaces until being released from the gas discharge ports 14, and the combustion residues adhere to and are held by these surfaces. Thus, a filter for cooling and filtering the combustion gas can be simplified or eliminated.

Although none of the gas generators described in the embodiments uses a known filter, when using filter additionally, the filter can be disposed in the above-mentioned porous member 50, 90 (in the upper portion of the combustion chamber 40), the space 60, or the gas discharge path 16. Further, a communicating hole can be formed on a circumferential wall portion of the outer circumference cylindrical member 41, and the filter can be disposed along inner/outer circumferential wall surfaces of the outer circumference cylindrical member 42.

The invention thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining device of a vehicle comprising:
a housing forming an outer shell container of the gas generator, and having a circumferential wall portion which is provided with a gas discharge port, a first end, and a second end, opposite to the first end, the first end and the second end being both closed;
a cup-shaped inner tube member disposed in the housing so that an opening end portion thereof is located in a side of a bottom plate of the second end, an inside of the cup-shaped inner tube member being an ignition chamber accommodating an ignition device, an outer space of the cup-shaped inner tube member being a combustion chamber charged with a gas generating agent, the inner tube member defining an inner circumferential surface of the combustion chamber;
an annular porous member defining an upper surface of the combustion chamber and being provided such that a space is formed between the annular porous member and the bottom plate of the first end of the housing, the annular porous member having a plurality of holes that allows communication between the combustion chamber and the space,
a gas passage extending in a radial direction of the housing and defined by a concave surface and a convex surface disposed in the space such that an inner circumferential of the concave surface and the convex surface is placed with a distance from the cup-shaped member;
a step portion defining a gas discharge path connecting the space and gas discharge port;
a communicating portion communicating the space and the gas discharge path and being open prior to activation of the gas generator; and
a total cross-sectional area of the gas discharge port being smaller than a total opening area of the plurality of holes of the annular porous member; a cross-sectional area of the communicating portion; and a cross-sectional area of the space.

2. The gas generator for a restraining device of a vehicle according to claim 1, wherein the annular porous member has a first annular planar portion having the plurality of holes, a first annular outside wall surface portion formed on an outer circumference of the first annular planar portion, and a first annular inside wall surface portion formed on an inner circumference of the first annular planar portion and on the same side as the first annular outside wall surface portion.

3. The gas generator for a restraining device of a vehicle according to claim 1, wherein the annular porous member has a first annular planar portion having the plurality of holes, a first annular outside wall surface portion formed on an outer circumference of the first annular planar portion, and a first annular inside wall surface portion formed on an inner circumference of the first annular planar portion and on a side opposite to the first annular outside wall surface portion.

4. The gas generator for a restraining device of a vehicle according to claim 1, wherein the concave surface and the convex surface is formed by a gas collision member,
the outer circumferential side of the gas passage is sealed in one of the concave surface or the convex surface by an outside wall surface formed on an outer circumferential portion thereof, and
combustion gas from the combustion chamber collides with the gas collision member after passing through the plurality of holes of the annular porous member, and is discharged to the gas discharge path through the gas passage that is not sealed.

5. The gas generator for a restraining device of a vehicle according to claim 4,
wherein the gas collision member further includes an annular outside wall surface formed on an outer circumferences of the concave surfaced and the convex surface, and
wherein the gas collision member is disposed on the porous member in the space such that the annular outside wall surface abuts against an outer circumference cylindrical member defining an outer circumferential surface of the combustion chamber.

6. The gas generator for a restraining device of a vehicle according to claim 1, wherein the gas discharge ports are formed closer to the second end of the housing than the communicating portion, the housing comprises a closure shell and a diffuser shell having the gas discharge port in a side surface portion of the diffuser shell, and the opening end of the diffuser shell has a flange portion extending from the side surface portion to the outside in the radial direction, and the flange portion exists on an imaginary straight line connecting the communication portion to the gas discharge ports.

7. A gas generator for a restraining device of a vehicle comprising:
a housing forming an outer shell container of the gas generator, and having a circumferential wall portion which is provided with a gas discharge port, a first end, and a second end, opposite to the first end, the first end and the second end being both closed;
a cup-shaped inner tube member disposed in the housing so that an opening end portion thereof is located in a side of a bottom plate of the second end, an inside of the cup-shaped inner tube member being an ignition chamber accommodating an ignition device, an outer space of the cup-shaped inner tube member being a combustion chamber charged with a gas generating agent, the inner tube member defining an inner circumferential surface of the combustion chamber;
an annular porous member defining an upper surface of the combustion chamber and being provided such that a space is formed between the annular porous member and the bottom plate of the first end of the housing, the annular porous member having a plurality of holes that allows communication between the combustion chamber and the space;
a gas passage extending in a radial direction of the housing and defined by a concave surface and a convex surface disposed in the space such that an inner circumferential of the concave surface and the convex surface is placed with a distance from the cup-shaped inner tube member;
a step portion defining a gas discharge path connecting the space and gas discharge port;
a communicating portion communicating the space and the gas discharge path and being open prior to activation of the gas generator.

8. A gas generator for a restraining device of a vehicle comprising:
a housing forming an outer shell container of the gas generator, and having a circumferential wall portion which is provided with a gas discharge port, a first end, and a second end, opposite to the first end, the first end and the second end being both closed;
a cup-shaped inner tube member disposed in the housing so that an opening end portion thereof is located in a side of a bottom plate of the second end, an inside of the cup-shaped inner tube member being an ignition chamber accommodating an ignition device, an outer space of the cup-shaped inner tube member being a combustion chamber charged with a gas generating agent, the inner tube member defining an inner circumferential surface of the combustion chamber;

an annular porous member defining an upper surface of the combustion chamber and being provided such that a space is formed between the annular porous member and the bottom plate of the first end of the housing, the annular porous member having a plurality of holes that allows communication between the combustion chamber and the space, a gas discharge path connecting the space and gas discharge port;

a communicating portion communicating the space and the gas discharge path and being open prior to activation of the gas generator; and a total cross-sectional area of the gas discharge port being smaller than a total opening area of the plurality of holes of the annular porous member; a cross-sectional area of the communicating portion; and a cross-sectional area of the space, wherein a gas collision member is disposed on the porous member in the space, the gas collision member has a concave surface and a convex surface forming a gas pathway, the outer circumferential side of the gas pathway is sealed in one of the concave surface or the convex surface by an outside wall surface formed on an outer circumferential portion thereof, and combustion gas from the combustion chamber collides with the gas collision member after passing through the plurality of holes of the annular porous member, and is discharged to the gas discharge path through the gas pathway that is not sealed.

9. The gas generator for a restraining device of a vehicle according to claim 8, wherein the gas discharge ports are formed closer to the second end of the housing than the communicating portion, the housing comprises a closure shell and a diffuser shell having the gas discharge port in a side surface portion of the diffuser shell, and the opening end of the diffuser shell has a flange portion extending from the side surface portion to the outside in the radial direction, and the flange portion exists on an imaginary straight line connecting the communication portion to the gas discharge ports.

* * * * *